United States Patent [19]

Usami et al.

[11] Patent Number: 4,505,232

[45] Date of Patent: Mar. 19, 1985

[54] BOILER TUBE

[75] Inventors: Kenichi Usami; Seishin Kirihara; Hiroyuki Doi; Choichi Asano, all of Hitachi; Masayuki Sukekawa, Kitaibaraki; Yasuhide Sakaguchi, Kure, all of Japan

[73] Assignees: Hitachi, Ltd.; Babcock-Hitachi Kabushiki Kaisha, both of Tokyo, Japan

[21] Appl. No.: 593,931

[22] Filed: Mar. 27, 1984

[30] Foreign Application Priority Data

Mar. 28, 1983 [JP] Japan .................................. 58-50495

[51] Int. Cl.³ ............................................ F22B 37/06
[52] U.S. Cl. .................................. 122/511; 75/128 A;
  122/DIG. 13; 138/143; 165/180; 165/DIG. 8;
  428/683
[58] Field of Search .................... 122/511, 512, 235 R,
  122/DIG. 13; 165/180, DIG. 8; 428/683, 685;
  420/584; 138/143; 148/38, 39, 127; 75/128 W,
  128 A, 128 C, 124 A

[56] References Cited

U.S. PATENT DOCUMENTS

| | | | |
|---|---|---|---|
| 3,366,473 | 1/1968 | Nehrenberg et al. | 75/128 C |
| 3,856,516 | 12/1974 | English | 75/128 A |
| 3,859,082 | 1/1975 | Denhard, Jr. et al. | 75/128 A |
| 3,969,153 | 7/1976 | Suzuki et al. | 122/DIG. 13 |
| 4,026,699 | 5/1977 | Eiselstein et al. | 420/584 |
| 4,054,174 | 10/1977 | Haller | 165/180 |
| 4,346,739 | 8/1982 | Asada | 138/143 |
| 4,463,061 | 7/1984 | Otoguro et al. | 428/683 |

FOREIGN PATENT DOCUMENTS

| | | | |
|---|---|---|---|
| 163244 | 12/1981 | Japan | 75/128 C |
| 110660 | 7/1983 | Japan | 75/128 W |

*Primary Examiner*—Edward G. Favors
*Assistant Examiner*—Steven E. Warner
*Attorney, Agent, or Firm*—Antonelli, Terry & Wands

[57] ABSTRACT

A boiler tube having a double-tube structure constituted by an inner tube and an outer tube integrated with each other. The inner tube is made of an alloy consisting essentially of, by weight, 0.02 to 0.15% of C, 0.5 to 3.5% of Si, not greater than 2% of Mn, 25 to 40% of Ni, 20.5 to 27% of Cr, 0.5 to 3% of Mo, not greater than 1% of Nb and the balance Fe and having a substantially fully austenite structure. The outer tube is made of an alloy consisting essentially of, by weight, 0.02 to 0.2% of C, not greater than 3.5% of Si, not greater than 2% of Mn, 33 to 45% of Ni, 30 to 40% of Cr and the balance Fe and having a substantially fully austenite structure. The inner tube made of the alloy having the composition specified above exhibits a high resistance to steam oxidation without any reduction in high-temperature strength even at elevated steam temperature, while the outer tube made of the alloy having the composition specified above exhibits a superior resistance to corrosion by coal combustion gas.

10 Claims, 3 Drawing Figures

BOILER TUBE

BACKGROUND OF THE INVENTION

1. Field of the Invention

The present invention relates to a boiler tube and, more particularly, to a boiler tube having a double tube structure.

2. Description of the Prior Art

Hitherto, in the boilers in which the steam temperature in the tube is not higher than 570° C. and the temperature of the tube outer wall surface contacting the combustion gas is between 600° and 650° C., low-alloy steels such as 2-¼ Cr-1 Mo steel and 9 Cr-1 Mo steel are generally used as the material of the tubes disposed in the region where the temperature is comparatively low, while austenitic stainless steels such as SUS 304, SUS 321 and SUS 347 are used as the materials of the tubes disposed in the region where the temperature is comparatively high.

In recent years, to cope with the demand for higher efficiency of electric power generation and so forth, there is a tendency to operate the boilers at high steam temperature of 600° C. and yet higher temperature of 650° C., and at a correspondingly increased steam pressure. This requires a 30° to 100° C. rise of the steam temperature in the boiler tubes and a corresponding rise of the tube outer wall surface temperature. Although the austenitic stainless steels are satisfactorily used as the material of the boiler tubes in the region of comparatively high temperature of the boiler when the steam temperature is around 570° C., steam oxidation of the boiler tubes made of austenitic stainless steel is drastically increased and the corrosion of the outer wall surfaces of tubes by the combustion gas is accelerated when the steam temperature is raised to 600° C.

Under these circumstances, boiler tubes having double tube structure, consisting of an inner tube having a high resistance to steam oxidation and an outer tube having a high resistance to high-temperature corrosion, have been proposed as boiler tubes specifically intended for use at high temperatures. An example of boiler tubes having double-tube structure is shown in Japanese Patent Application Laid-Open No. 57-120002.

In recent years, there is a trend for higher steam temperature also in coal burning boilers which makes use of coal as the fuel. The mechanism of high-temperature corrosion caused by the coal combustion gas is different from that caused by the heavy oil combustion gas. Therefore, the material highly resistant to the high-temperature corrosion caused by the heavy oil combustion gas does not always exhibit high resistance to the high-temperature corrosion caused by the coal combustion gas. Thus, there is an increasing demand for development of boiler tubes which simultaneously meet the requirements for high resistance to steam oxidation, excellent high-temperature strength and high resistance to high-temperature corrosion.

SUMMARY OF THE INVENTION

Object of the Invention

Accordingly, an object of the invention is to provide a boiler tube which has a high resistance to steam oxidation and an excellent high-temperature strength, as well as a high resistance to corrosion caused by coal combustion gas.

Brief Summary of the Invention

To this end, according to the invention, there is provided a boiler tube having a double-tube structure constituted by an inner tube and an outer tube integrated with each other, characterized in that: the inner tube is made of an alloy consisting essentially of, by weight, 0.02 to 0.15% of C, 0.5 to 3.5% of Si, not greater than 2% of Mn, 25 to 40% of Ni, 20.5 to 27% of Cr, 0.5 to 3% of Mo, not greater than 1% of Nb and the balance Fe and a substantially fully austenite structure; and the outer tube is made of an alloy consisting essentially of, by weight, 0.02 to 0.2% of C, not greater than 3.5% of Si, not greater than 2% of Mn, 33 to 45% of Ni, 30 to 40% of Cr and the balance Fe and having a substantially fully austenite structure.

Thus, the invention proposes a boiler tube having a double-tube structure consisting of an inner tube having a high resistance to steam oxidation and an excellent high-temperature strength, and an outer tube having a higher resistance to corrosion than the inner tube.

The above and other objects, features and advantages of the invention will become clear from the following description of the preferred embodiments with reference to the accompanying drawings.

DESCRIPTION OF THE PREFERRED EMBODIMENT

Figure 1:
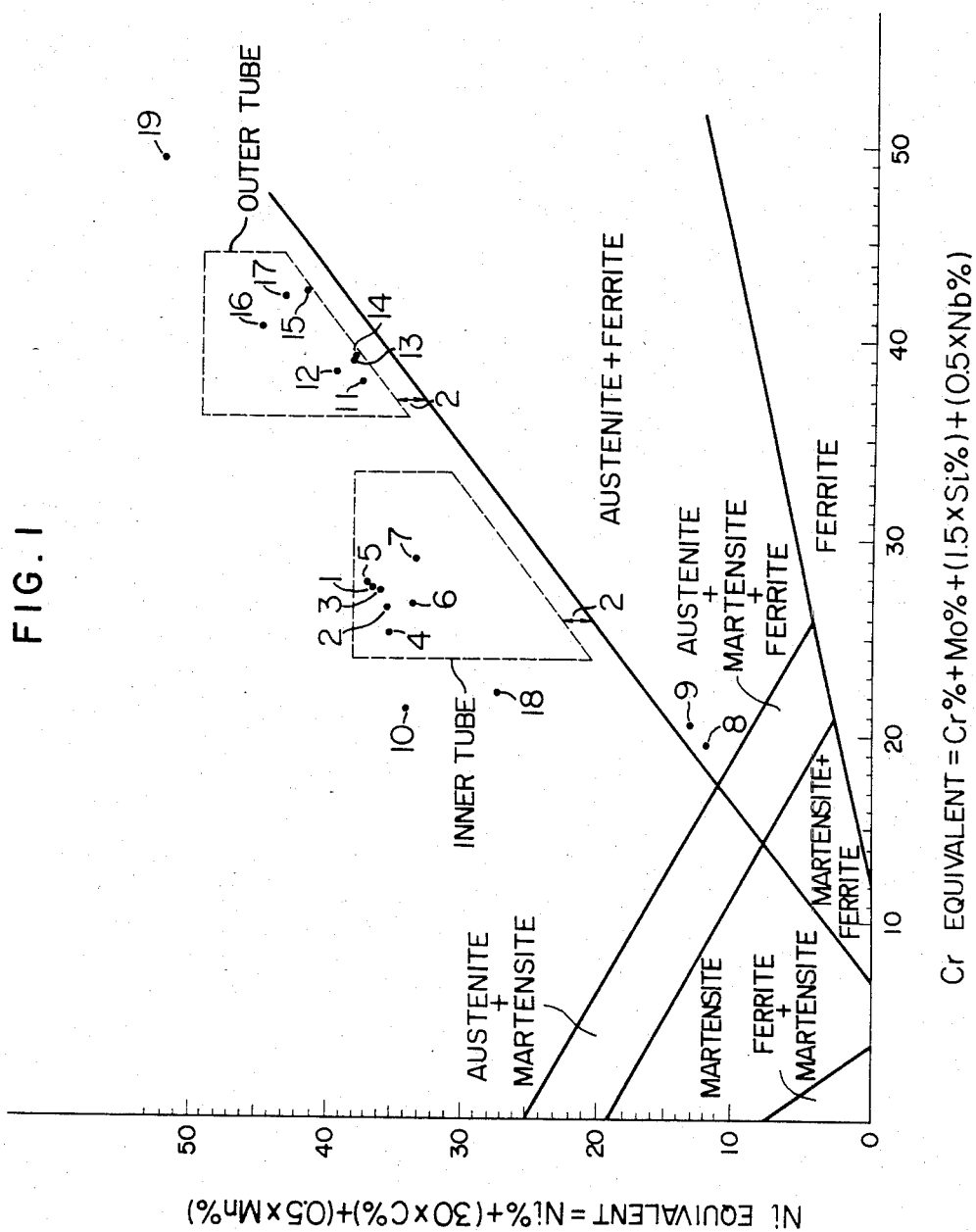
FIG. 1 is a diagram showing the relationship between Cr equivalent and Ni equivalent.

A description will be made first as to the reasons for restricting the content ranges of the constituent elements in the alloy used as the material of the inner tube.

Incidentally, in this specification the percent means the percent by weight.

C: When the C content exceeds 0.02%, C reacts with carbide formers such as Mo, Nb, etc. to form carbides in grains to increase the creep strength at high temperature. On the other hand, C content exceeding 0.15% decreases the corrosion resistance and adversely affects the workability and weldability, due to precipitation of carbides in the grain boundary. For these reasons, the C content is limited to range between 0.02 and 0.15% and, more preferably, between 0.03 and 0.08%.

Si: Si remarkably improves the corrosion resistance when its content exceeds 0.5%. However, Si content exceeding 3.5% seriously impairs the producibility and workability to make the production of the boiler tube extremely difficult, and unfavourably permits the precipitation of ferrite phase. For these reasons, the Si content is limited to range between 0.5 and 3.5%. Taking into account the corrosion resistance and workability, the Si content preferably ranges between 1 and 2%.

Cr: Cr effectively enhances the resistance to steam oxidation when its content exceeds 20.5% but impairs the high-temperature strength when its content exceeds 27%. The Cr content, therefore, is limited to range between 20.5 and 27%, more preferably between 22 and 26%.

Mo: Mo content between 0.5 and 3% effectively strengthens the austenite matrix without adversely affecting the resistance to steam oxidation. In addition, a part of Mo is precipitated in the form of carbides to enhance the high-temperature strength and to strengthen the grain boundary. However, Mo content exceeding 3% allows the formation of ferrite to facilitate the precipitation of sigma phase thereby seriously impairing the workability. For these reasons, the Mo content is limited to range between 0.5 and 3% and, more preferably, between 1 and 2.5%.

Nb: Nb precipitates, when its content is not greater than 1%, in the form of carbide to enhance the high-temperature strength and ductility. Particularly, an Nb content between 0.2 and 0.7% is preferred. Further, the ratio Nb/C of the Nb content to C content ranging between 6 and 8 is specifically preferred.

Ni: Ni co-exists with Cr to increase the plastic workability and to stabilize the austenite structure. To such ends, the Ni content should be not smaller than 25%. However, Ni content exceeding 40% with the above-specified Cr content undesirably coarsens the columnar crystals to increase the tendency of cracking in the plastic working. For these reasons, the Ni content is limited to range between 25 and 40% and, more preferably, between 29 and 35%.

Ti, W: Ti and W are elements which cause precipitation of carbides in the matrix to increase the ductility at high temperature and to refine the grain size thereby increasing the corrosion resistance. However, when their contents exceed 0.5%, the weldability is impaired to increase the possibility of weld defects. The Ti and W contents, therefore, are limited to be not greater than 0.5% and, more preferably, between 0.1 and 0.4%.

B: B content not greater than 0.5% effectively strengthens the grain boudary to increase the ductility at high temperature. The B content is preferably selected to range between 0.002 and 0.03% in view of the C content because the ratio B/C of the B content to C content not smaller than 0.2 adversely affects the weldability and workability.

The heat-resisting Fe-base alloy of the invention used as the material of the inner tube corresponds to an alloy wherein Mo, Nb and Si are added to a (20.5–27%) Cr - (25–40%) Ni steel in view of the resistance to steam oxidation, high-temperature strength, ductility and weldability. Particularly, it corresponds to an alloy wherein Ti and Al are eliminated from and Mo, Nb and Si are added to Incoloy 800, which is a heat-resisting Fe-base alloy, in view of the resistance to steam oxidation, weldability, high-temperature strength, ductility and intergranular corrosion resistance. Further, the inner tube is required to have higher resistance to corrosion caused by steam than the conventional boiler tube material such as SUS 304 and SUS 321 having Cr contents of between 18 and 20%. To this end, it is necessary that the Cr content be increased above 20.5%. The Cr solely, however, cannot provide sufficient resistance to corrosion caused by steam of high temperature of between 600 and 650° C., and the addition of not smaller than 0.5% of Si is essential. Since both of Cr and Si are ferrite formers, the amount of increase in the Cr equivalent due to addition of Si is preferably selected such that the plastic workability is enhanced by reducing the Cr content or increasing the Ni equivalent.

The increased steam temperature gives a rise to the demand for greater high-temperature strength. In the Ni-Cr system alloys, the Ni equivalent and Cr equivalent significantly affect the stabilization of the austenite structure and the plastic workability. As shown in FIG. 1, a stable structure is obtained and a good ductility is attained when the Ni equivalent takes a value which is 2 higher than the line which marks the lower limit of the fully austenite region. With the alloy having this structure, it is possible to produce seamless pipes by a plastic work without the fear of cracking.

The Ni equivalent and the Cr equivalent are given by the following formulae, respectively. The percent in parentheses means the percent by weight.

Ni equivalent = Ni(%) + [30 × C(%)] + [0.5 × Mn(%)]

Cr equivalent = Cr(%) + Mo(%) + [1.5 × Si(%)] + [0.5 × Nb(%)]

In the case of the inner tube, the Cr equivalent and the Ni equivalent preferably range between 24 and 33% and between 21 and 38%, respectively.

As mentioned before, the boiler tube of the invention has a double-tube structure having the inner tube and the outer tube having a higher corrosion resistance than the inner tube. Preferably, the outer tube also has an excellent high-temperature strength and high weldability in view of the fact that the outer tube is fixed by welding or the like measure.

The alloy used as the material of this outer tube preferably has the composition consisting essentially of 0.02 to 0.2% of C, not greater than 3.5% of Si, not greater than 2% of Mn, 33 to 45% of Ni, 30 to 40% of Cr and the balance Fe. The alloy may additionally contain 0.5 to 3 wt % of Mo and not greater than 1% of Nb. In place of Mo and Nb or in addition to Mo and Ni, it is possible to add not greater than 0.5 wt % of W, not greater than 0.5 wt % of Ti and not greater than 0.03% of B.

A description will be made hereinunder as to the reasons for restricting the content ranges of the constituent elements in the alloy used as the material of the outer tube.

C: When the C content is not smaller than 0.02%, C is combined with carbide formers such as Mo, Nb, W and Ti to form carbides in the grains to increase the creep strength at high temperature. However, C content exceeding 0.2% causes a reduction in the precipitation of the carbides in the grain boundary and adversely affects the workability and weldability. From this point of view, the C content is selected preferably to be small. Particularly, the C content between 0.03 and 0.08% is preferred.

Cr: Cr content not smaller than 30% is quite effective in prevention of corrosion caused at high temperature by the coal combustion gas. The effect of Cr, however, is substantially saturated when the Cr content exceeds 40%. The Cr content, therefore, is limited to range between 30 and 40% and, more preferably, between 33 and 37%.

Mo: Mo content of between 0.5 and 3% strengthens the austenite matrix without adversely affecting the resistance to high-temperature corrosion caused by the coal combustion gas. In addition, such Mo content permits precipitation of Mo in the form of carbide in the (30–40%) Cr-(33–45%)Ni steel to effectively raise the high-temperature strength and to strengthen the grain boundary. Thus, the Mo content is limited preferably to range between 1 and 2%, because Mo content exceeding 3% may adversely affect the workability.

Nb: Nb is precipitated, when its content is not greater than 1%, in the form of carbides and effectively increases the ductility as well as the high-temperature strength. Since Nb content exceeding 1% seriously impairs the workability and weldability, the Nb content is limited preferably to range between 0.1 and 0.5%.

W, Ti: W and Ti are elements which are precipitated in the matrix in the form of carbides to increase the ductility at high temperature without lowering the corrosion resistance. Taking the weldability into account, however, the W and Ti contents are limited preferably to be not greater than 0.5% and, more preferably, between 0.1 and 0.4%.

B: B effectively strengthens the grain boundary to improve the ductility at high temperature but does not adversely affect the corrosion resistance. The B content is limited preferably to be not greater than 0.03% and, more preferably, between 0.02 and 0.03%, taking into account the weldability and in view of the C content.

Ni: Ni coexists with Cr to improve the plastic workability and to stabilize the austenite structure. To this end, the Ni content should be not smaller than 33%. Since the steel used as the material of this outer tube contains 30 to 40% of Cr and ferrite formers such as Mo, Nb and W, it is necessary to effect the control by means of Ni equivalent, in order to maintain a stable austenite phase. The Ni content, however, should not exceed 45% because Ni reacts with S in the coal combustion gas to adversely affect the corrosion resistance.

In view of the composition stated above, the alloy used as the material of the outer tube has Cr equivalent and Ni equivalent which range between 36 and 44% and between 35 and 50%, respectively.

In this alloy used as the material of the outer tube, the corrosion resistance and the high-temperature strength are increased due to the inclusion of Mo, Nb, W, Ti, B and Si. However, if ferrite exists in the austenite structure, embrittlement due to precipitation of sigma phase tends to be caused at high temperature. To obviate this problem, it is preferred that the Ni equivalent is at least 2 greater than the line marking the lower limit of the fully austenite region shown in FIG. 1.

The outer tube having the composition stated hereinbefore provides an excellent high-temperature strength. This in turn permits a reduction in the wall thickness of the inner tube.

In the boiler tube in accordance with the invention, the inner tube has a wall thickness which is greater than that of the outer tube. The inner tube mainly provides the resistance to steam oxidation and the high-temperature strength, while the outer tube ensures the resistance to corrosion caused by the coal combustion gas. Taking into account the high-temperature strength, the wall thickness of the outer tube is selected preferably to range between 10 and 30% of that of the inner tube.

The boiler tube in accordance with the invention is produced by, for example, the following process. As the first step, a hollow billet for outer tube and a hollow billet for inner tube are prepared and assembled together to form a double-tube billet. The double-tube billet is then heated and subjected to a hot extrusion to metallurgically bond the inner tube and the outer tube to each other. Then, the boiler tube blank thus prepared is subjected to a cooling, cold elongation by an elongator such as a mandrell mill, heat treatment and cutting to become the final product.

EMBODIMENT 1

Table 1 shows the chemical compositions (wt %) of the alloys used as the material of the inner tube in this embodiment. Test samples of these alloys were ground after a heat treatment and were subjected to the test after finishing the surfaces by #800 emery paper. As the heat treatment, the comparison alloys No. 8 and No. 9, which are SUS 304 steel and SUS 321 steel, were subjected to a solid solution treatment consisting of heating at 1050° C. for 30 minutes followed by a water cooling. On the other hand, the comparison alloy No. 10 which is Incoloy 800, and the alloys Nos. 1 to 7 in accordance with the invention were subjected to a solid solution treatment consisting of heating at 1150° C. for 30 minutes followed by a water cooling.

Figure 2:
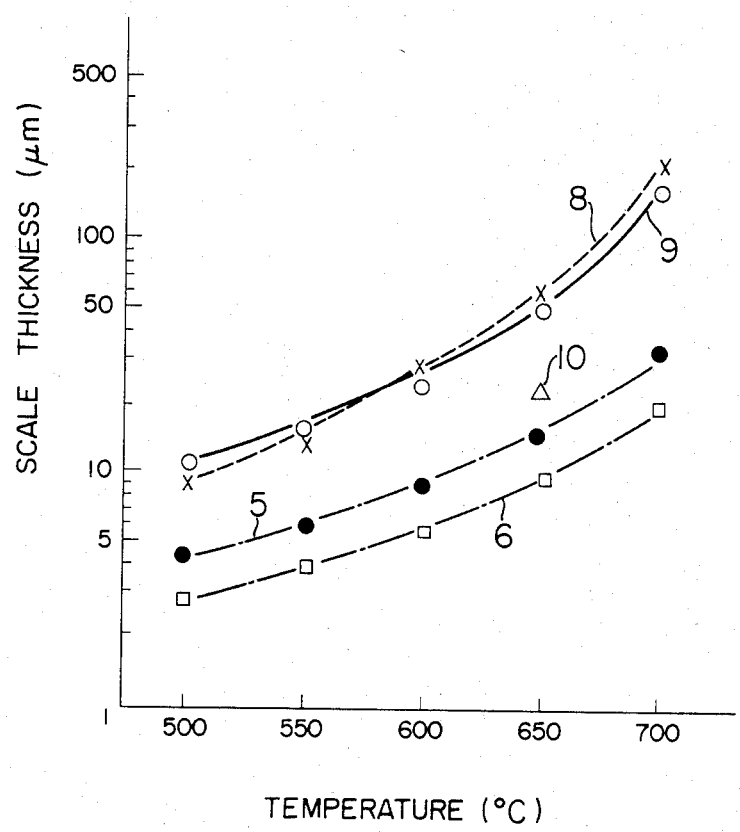
FIG. 2 is a diagram showing the relationship between the thickness of the scale formed on the boiler tube and the heating temperature.

FIG. 2 shows the relationship between the steam temperature and the thickness of the scale formed on the alloy sample when the alloy sample is subjected to a 1000-hour corrosion test conducted in the steam of a temperature of between 500° and 700° C. From this Figure, it will be seen that, in the alloy in accordance with the invention, the resistance to steam oxidation is improved as the Si content is increased. In fact, the alloys of the invention exhibit resistance to steam oxidation which is more than about 3 times as high as those of the comparison alloy No. 8 (SUS 304) and the comparison alloy No. 9 (SUS 321). The difference in the resistance to corrosion between the alloys in accordance with the invention and the conventional alloys (comparison alloys Nos. 8 and 9) becomes greater as the temperature becomes higher. It is also understood that the alloys of the invention have corrosion resistances superior to that of the comparison alloy Incoloy 800 which is also an Fe-base alloy.

Table 2 shows the 650° C., 5000-hr creep rupture strength and ductility of the alloys of the invention in comparison with those of the Incoloy 800 which is also an Fe-base alloy. It will be seen from this table that the Incoloy 800 exhibits a creep rupture strength of about 14 Kg/mm² and a ductility of 20%, while the alloys of the invention exhibit creep rupture strength ranging between 16 and 20 Kg/mm² and ductility ranging between 22 and 26% which are apparently superior to those of the Incoloy 800.

Table 3 shows the chemical compositions (wt %) of the alloys used as the material of the outer tube. The test samples of these alloys for the outer tube were heat-treated, ground and then finished with #800 emery paper before they are subjected to the test. The SUS 304, SUS 310 which is 25Cr-20Ni alloy and Inconel 671 which is 50Cr-50Ni alloy were used as the comparison alloys. The comparison alloy No. 8 (SUS 304) was subjected to a solid solution treatment consisting of heating at 1050° C. for 30 minutes followed by a water cooling, while the comparison alloy No. 18 (SUS 310) was subjected to a solid solution treatment consisting of heating at 1150° C. for 30 minutes followed by a water cooling. The solid solution treatment for the comparison alloy No. 19 (Inconel 671) and the alloys of the invention was conducted by heating them at 1200° C. for 30 minutes followed by a water cooling.

TABLE 1

| Alloy No. | C | Si | Mn | Ni | Cr | Mo | Nb | Ti | Al | W | B | Ni Eq. | Cr Eq. |
|---|---|---|---|---|---|---|---|---|---|---|---|---|---|
| alloys of invention | | | | | | | | | | | | | |
| 1 | 0.061 | 0.75 | 1.15 | 34.2 | 24.8 | 1.25 | 0.45 | | | | | 36.61 | 27.40 |
| 2 | 0.051 | 0.92 | 1.02 | 33.4 | 23.8 | 1.15 | 0.42 | 0.33 | | | | 35.44 | 26.54 |
| 3 | 0.055 | 0.88 | 0.99 | 33.8 | 24.1 | 1.20 | 0.43 | | | 0.29 | | 35.95 | 27.33 |
| 4 | 0.049 | 0.74 | 1.03 | 33.3 | 22.9 | 1.08 | 0.39 | | | | 0.0151 | 35.29 | 25.29 |
| 5 | 0.065 | 0.90 | 1.12 | 34.5 | 25.1 | 1.12 | 0.35 | 0.34 | | 0.35 | 0.0059 | 37.01 | 27.75 |
| 6 | 0.045 | 2.18 | 0.82 | 31.9 | 22.12 | 1.08 | 0.42 | | | | | 33.66 | 26.68 |
| 7 | 0.059 | 3.12 | 1.34 | 30.9 | 22.40 | 1.46 | 0.46 | | | | | 33.34 | 29.00 |
| comparison alloys | | | | | | | | | | | | | |
| 8 SUS 304 | 0.060 | 0.63 | 1.74 | 9.20 | 18.5 | | | | | | | 11.87 | 19.45 |
| 9 SUS 321 | 0.048 | 0.59 | 1.65 | 10.87 | 19.7 | | | 0.31 | | | | 13.14 | 20.59 |
| 10 Incoloy 800 | 0.075 | 0.32 | 1.18 | 31.07 | 20.8 | | | 0.43 | 0.47 | | | 33.91 | 21.28 |

TABLE 2

| | | 650° C., 5000 hr | |
|---|---|---|---|
| | | creep rupture strength (Kg/mm$^2$) | creep rupture elongation (%) |
| alloys of invention | 1 | 16.5 | 25.5 |
| | 2 | 16.3 | 23.5 |
| | 3 | 16.6 | 23.8 |
| | 4 | 17.3 | 24.3 |
| | 5 | 19.8 | 25.3 |
| | 6 | 16.3 | 22.8 |
| Comparison alloys | Incoloy 800 | 13.9 | 19.8 |

TABLE 4

| | | 750° C. creep rupture strength (Kg/mm$^2$) |
|---|---|---|
| alloys of invention | 11 | 4.1 |
| | 12 | 4.3 |
| | 14 | 4.8 |
| | 16 | 4.1 |
| | 17 | 4.9 |
| comparison alloys | 19 | 3.8 |

TABLE 3

| Alloy No. | C | Si | Mn | Ni | Cr | Mo | Nb | Ti | W | B | Ni Eq. | Cr Eq. |
|---|---|---|---|---|---|---|---|---|---|---|---|---|
| alloys of invention | | | | | | | | | | | | |
| 11 | 0.051 | 0.87 | 1.25 | 35.3 | 35.3 | 1.15 | 0.35 | | | | 37.46 | 37.93 |
| 12 | 0.045 | 0.75 | 1.55 | 37.4 | 35.8 | 1.25 | 0.38 | | 0.35 | | 39.53 | 38.37 |
| 13 | 0.048 | 0.69 | 1.43 | 30.2 | 36.3 | 1.32 | 0.34 | 0.25 | 0.27 | | 38.36 | 38.83 |
| 14 | 0.053 | 0.89 | 1.29 | 35.9 | 36.5 | 1.08 | 0.41 | | | 0.0116 | 38.14 | 39.12 |
| 15 | 0.049 | 0.92 | 1.71 | 39.2 | 39.6 | 1.21 | 0.45 | | | | 41.53 | 42.42 |
| 16 | 0.055 | 0.85 | 1.82 | 42.3 | 38.2 | 1.03 | 0.39 | | 0.31 | | 44.86 | 40.70 |
| 17 | 0.059 | 0.93 | 1.71 | 40.5 | 39.5 | 1.10 | 0.43 | | 0.41 | 0.0053 | 43.10 | 42.21 |
| comparison alloys | | | | | | | | | | | | |
| 8 SUS 304 | 0.060 | 0.63 | 1.74 | 9.20 | 18.5 | | | | | | 11.87 | 19.45 |
| 18 SUS 310 | 0.054 | 1.13 | 1.35 | 25.1 | 20.4 | | | | | | 27.40 | 22.10 |
| 19 Inconel 671 | 0.06 | 0.48 | 0.52 | bal. | 48.5 | | | 0.33 | | | 52.17 | 49.22 |

Figure 3:
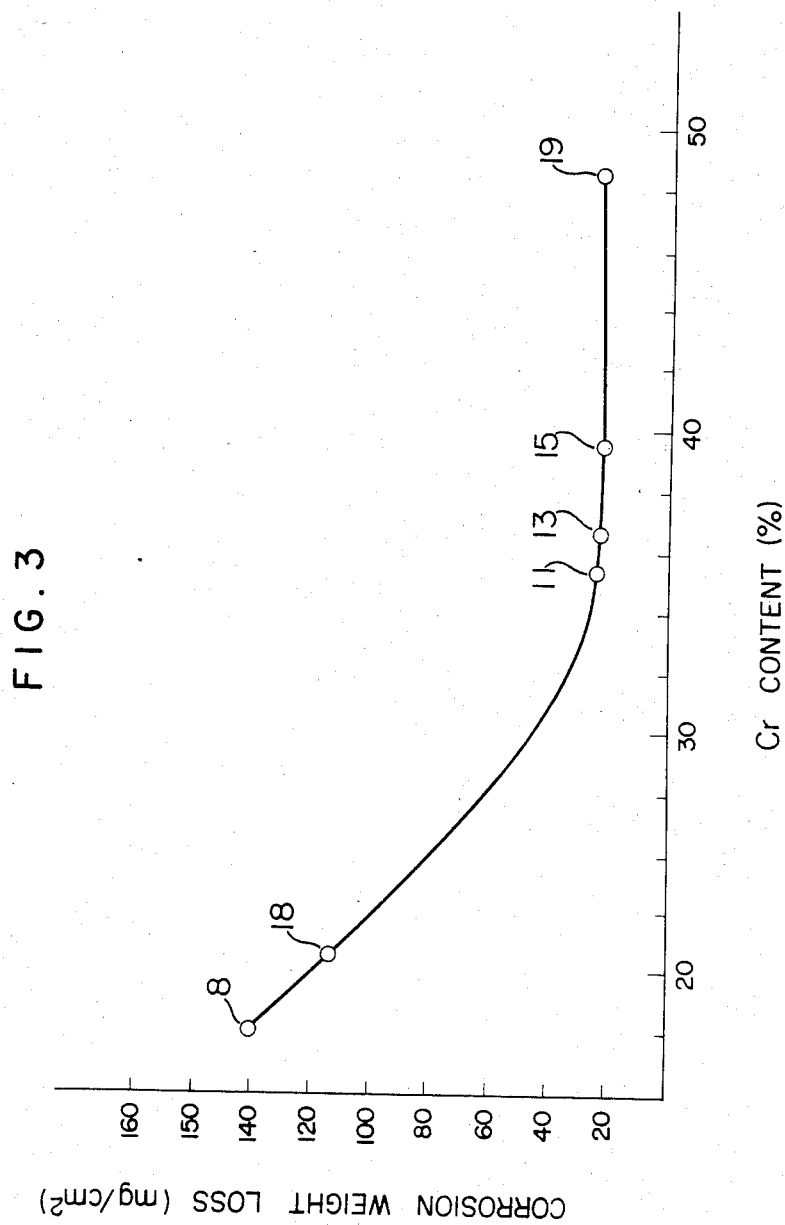
FIG. 3 is a diagram showing the relationship between the corrosion weight loss by the high-temperature corrosion and the Cr content of the boiler tube material.

FIG. 3 shows the relationship between the corrosion weight loss and Cr content as observed in a test which was conducted by applying 41%K$_2$SO$_4$- 34%Na$_2$SO$_4$-25%Fe$_2$O$_3$ to the test pieces and then allowing corrosion of the test pieces by placing them for 100 hours in a gas having a composition corresponding to that of the coal combustion gas: namely, a composition consisting essentially of 1% of SO$_2$, 5% of O$_2$, 15% of CO$_2$ and the balance N$_2$ (Pt catalyst).

The alloys of the invention, having greater Cr contents than the comparison alloys Nos. 8 and 18 show correspondingly higher corrosion resistances. The corrosion resistances of the alloys of the invention well compared with that of the comparison alloy No. 19 (Inconel 671) which has a higher Cr content than the alloys of the invention. From this fact, it will be understood that the alloys used as the outer tube of the boiler tube of the invention has quite an excellent corrosion resistance.

Table 4 shows the 750° C., 1000-hr creep rupture strength of the alloys of the invention in comparison with that of the comparison alloy No. 19 (Inconel 671).

As will be seen from this table, the alloys of the invention exhibit higher creep rupture strengths than the Inconel 671.

Ni equivalents and Cr equivalents of the alloys Nos. 1 to 7 and 11 to 17 of the invention as shown in Tables 1 and 3, as well as those of the comparison alloys Nos. 8 to 10 and 18 and 19 are plotted in FIG. 1. In this figure, the areas demarcated by broken lines show ranges of Ni equivalent and Cr equivalent of alloys which can suitably be used as the materials of the inner and outer tubes of the double-tube structure of the boiler tube in accordance with the invention.

EMBODIMENT 2

A hollow billet of an alloy having a composition same as that of the sample No. 1 shown in Table 1 was prepared as the blank of the inner tube. At the same time, a hollow billet was prepared as the blank of the outer tube, from an alloy having a composition consisting essentially of 0.050% of C, 0.86% of Si, 1.20% of Mn, 40.2% of Ni, 35.1% of Cr, 1.25% of Ma, 0.42% of Nb and the balance Fe. These billets were assembled together to form a double hollow billet and was hot-rolled by a Mannesmann mill into a double tube blank. This blank was then subjected to a cold elongation conducted by a mandrel mill, soft annealing and 2nd cold elongation and made into a tube of a double-wall structure having an outside diameter of 45 mm, inside diameter of 19 mm and a wall thickness of 13 mm (wall thickness of inner tube 10.5 mm, wall thickness of outer tube 2.5 mm). The tube was then subjected to a solid solution treatment which was conducted by maintaining the tube at 1170° C. for 30 minutes followed by a water cooling to become the final product.

It will be clear to those skilled in the art that the alloy of the invention does not cause any cracking in the production of the seamless alloy tube by extrusion or Mannesmann process.

As will be understood from the foregoing description, the present invention provides a boiler tube having a double-tube structure which is superior to conventional ones in both aspects of the corrosion resistance of the outer tube surface which is a matter of significance particularly in boilers using coal as the fuel and the resistance to steam oxidation of the inner tube surface which imposes a problem particularly in boilers which operates at high steam temperature.

Thus, the boiler tube of the invention can suitably be used in the boilers for power generating plants and offers a remarkable improvement in the electric power generating efficiency when applied to such a use.

What is claimed is:

1. A boiler tube having a double-tube structure constituted by an inner tube and an outer tube integrated with each other, characterized in that:

said inner tube is made of an alloy consisting essentially of, by weight, 0.02 to 0.15% of C, 0.5 to 3.5% of Si, not greater than 2% of Mn, 25 to 40% of Ni, 20.5 to 27% of Cr, 0.5 to 3% of Mo, not greater than 1% of Nb and the balance Fe and having a substantially fully austenite structure; and said outer tube is made of an alloy consisting essentially of, by weight, 0.02 to 0.2% of C, not greater than 3.5% of Si, not greater than 2% of Mn, 33 to 45% of Ni, 30 to 40% of Cr and the balance Fe and having a substantially fully austenite structure.

2. A boiler tube having a double-tube structure constituted by an inner tube and an outer tube integrated with each other, characterized in that:

said inner tube is made of an alloy consisting essentially of, by weight, 0.02 to 0.15% of C, 0.5 to 3.5% of Si, not greater than 2% of Mn, 25 to 40% of Ni, 20.5 to 27% of Cr, 0.5 to 3% of Mo, not greater than 1% of Nb, each not greater than 0.5% of at least one of Ti, B and W and the balance Fe and having a substantially fully austenite structure; and said outer tube is made of an alloy consisting essentially of, by weight, 0.02 to 0.2% of C, not greater than 3.5% of Si, not greater than 2% of Mn, 33 to 45% of Ni, 30 to 40% of Cr and the balance Fe and having a substantially fully austenite structure.

3. A boiler tube according to claim 1, wherein said alloy from which said outer tube is made further contains, by weight, 0.5 to 3% of Mo and not greater than 1% of Nb.

4. A boiler tube according to claim 1 or 3, wherein said alloy from which said outer tube is made further contains, by weight, not greater than 0.5% of W, not greater than 0.5% of Ti and not greater than 0.03% of B.

5. A boiler tube according to claim 1, wherein the Ni equivalent of said alloy from which said inner tube is made is at least 2 higher than the line marking the lower limit of the fully austenite region shown in FIG. 1.

6. A boiler tube according to any one of claims 1 to 3 or 5, wherein said alloy from which said inner tube is made has a Cr equivalent of 24 to 33 and an Ni equivalent of 21 to 38, while said alloy from which said outer tube is made has a Cr equivalent of 36 to 44 and an Ni equivalent of 35 to 50.

7. A boiler tube according to any one of claims 1 to 3 or 5, wherein the wall thickness of said outer tube ranges between 10 and 30% of that of said inner tube.

8. A boiler tube according to claim 4, wherein said alloy from which said inner tube is made has a Cr equivalent of 24 to 33 and an Ni equivalent of 21 to 38, while said alloy from which said outer tube is made has a Cr equivalent of 36 to 44 and an Ni equivalent of 35 to 50.

9. A boiler tube according to claim 4, wherein the wall thickness of said outer tube ranges between 10 and 30% of that of said inner tube.

10. A boiler tube according to claim 6, wherein the wall thickness of said outer tube ranges between 10 and 30% of that of said inner tube.

* * * * *